United States Patent [19]

Harder

[11] Patent Number: 5,167,835
[45] Date of Patent: Dec. 1, 1992

[54] METHOD OF SCAVENGING OXYGEN FROM BOILER WATERS WITH SUBSTITUTED QUINOLINES

[75] Inventor: Scott R. Harder, Naperville, Ill.

[73] Assignee: Nalco Chemical Company, Naperville, Ill.

[21] Appl. No.: 788,676

[22] Filed: Nov. 6, 1991

[51] Int. Cl.$^5$ .............................................. C02F 1/20
[52] U.S. Cl. .................... 210/750; 210/757; 252/188.28; 252/393; 422/17
[58] Field of Search ............ 210/749, 750, 757; 422/14-19; 252/178, 188.28, 393, 401, 405

[56] References Cited

U.S. PATENT DOCUMENTS

| | | | |
|---|---|---|---|
| 4,025,631 | 5/1977 | Bar et al. | 252/401 |
| 4,067,690 | 2/1977 | Cuisia et al. | 252/387 |
| 4,269,717 | 10/1980 | Slovinsky | 210/750 |
| 4,278,635 | 12/1979 | Kerst | 422/14 |
| 4,279,767 | 7/1980 | Muccitelli | 252/178 |
| 4,282,111 | 4/1980 | Ciuba | 252/178 |
| 4,289,645 | 7/1980 | Muccitelli | 252/178 |
| 4,311,599 | 11/1980 | Slovinsky | 210/757 |
| 4,350,606 | 10/1980 | Cuisia et al. | 252/392 |
| 4,363,734 | 8/1981 | Slovinsky | 210/750 |
| 4,419,327 | 12/1981 | Kelly et al. | 422/17 |
| 4,487,708 | 3/1981 | Muccitelli | 252/178 |
| 4,540,494 | 3/1981 | Fuchs et al. | 210/750 |
| 4,541,932 | 11/1984 | Muccitelli | 210/750 |
| 4,549,968 | 5/1984 | Muccitelli | 210/750 |
| 4,569,783 | 11/1984 | Muccitelli | 252/188.28 |
| 4,626,411 | 4/1985 | Nemes et al. | 422/13 |
| 4,929,364 | 11/1988 | Reardon et al. | 210/750 |
| 4,968,438 | 11/1988 | Soderquist et al. | 210/750 |

OTHER PUBLICATIONS

"The Oxidation and Degradation Products of Volatile Oxygen Scavengers and Their Relevance in Plant Applications", Ellis, et al. Corrosion, 87, (Mar. 9—13, 1987), Paper No. 432.
"New Insights into Oxygen Corrosion Control", Reardon, et al., Corrosion, 87, (Mar. 9-13, 1987), Paper No. 438.
"Oxygen Scavengers", Nowak, Corrosion, 89, (Apr. 7-21, 1989). Paper No. 436.
"Characterization of Iron Oxides Films Generated in a New Boiler Feed Water Simulator", Batton, et al, Corrosion, 90 (Apr. 23-27, 1990), Paper No. 144.
"Controlling Oxygen in Steam Generating Systems", Jonas, et al., Power, pp. 43-52, (May, 1990).

*Primary Examiner*—Thomas Wyse
*Attorney, Agent, or Firm*—Robert A. Miller; Donald G. Epple; Joseph B. Barrett

[57] ABSTRACT

New oxygen scavengers for boiler waters have been discovered, which oxygen scavengers are based upon substituted quinoline compounds. These compounds provide oxygen scavenging capabilities, metal passivating capabilities, and volatility such that condensate systems in an operating boiler are protected. The compounds may be formulated with other oxygen scavengers and other common treatment agents used in boiler waters, especially the volatile amine, such as, but not limited to, morpholine and diethylhydroxylamine.

The preferred quinoline compounds is ethoxyquin, i.e. 6-ethoxy-1,2,-dihydro-2,2,4-dihydroquinoline.

10 Claims, 4 Drawing Sheets

15 ppm Ethoxyquin 15 ppm Ethoxyquin

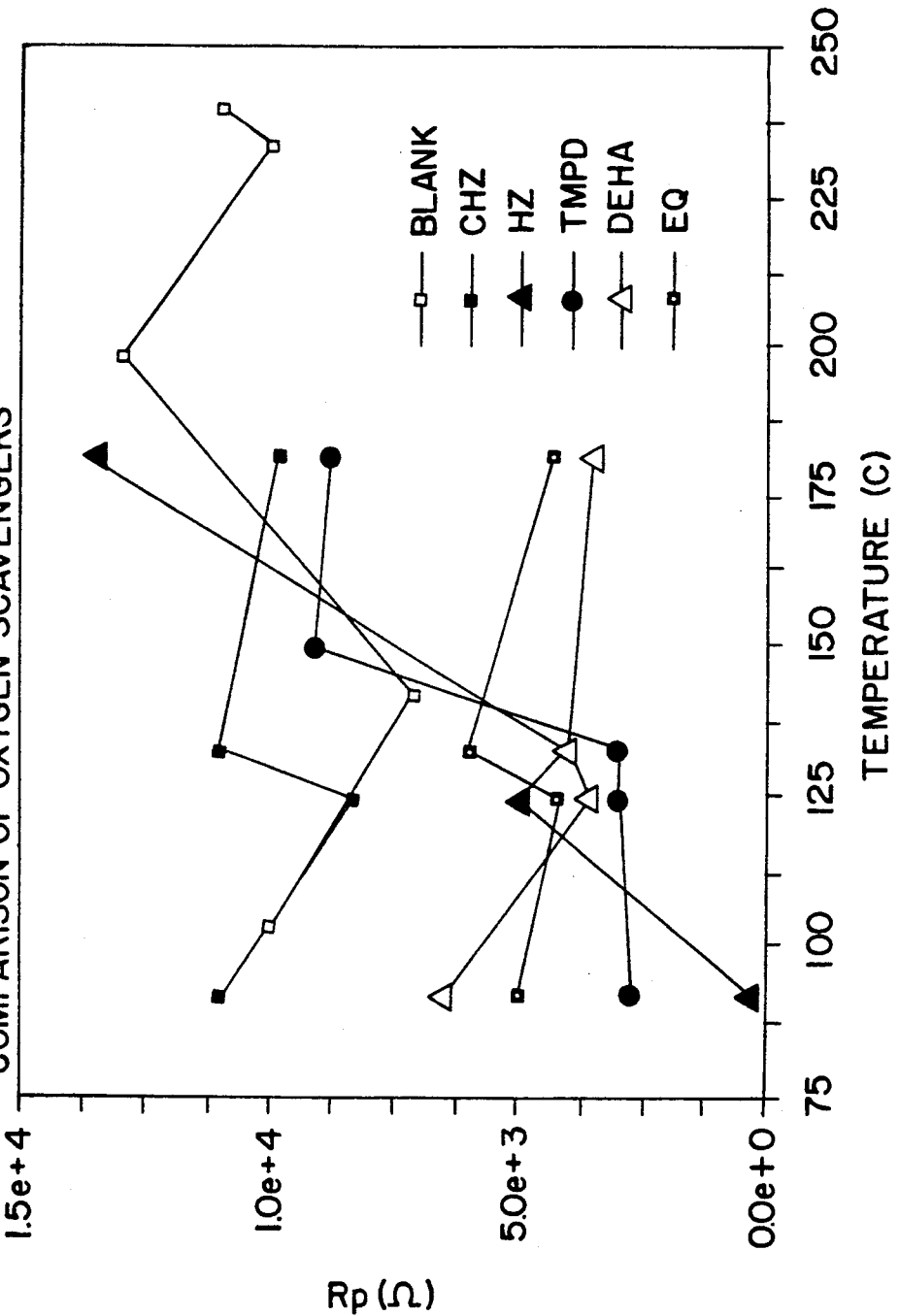

5,167,835

METHOD OF SCAVENGING OXYGEN FROM BOILER WATERS WITH SUBSTITUTED QUINOLINES

INTRODUCTION

This invention relates to removing oxygen from boiler waters, thereby protecting metal surfaces in contact with said boiler waters from corrosion caused by the presence of oxygen in these waters.

Additionally, this invention relates to passivation of metal surfaces in contact with boiler waters, which passivation also inhibits corrosion while avoiding scales of such character as to inhibit heat transfer.

The invention is intended for use in all boiler systems, but is particularly useful in high pressure boiler water systems, for example, those systems operating at a temperature above 250° F., and up to and sometime exceeding 600° F., and at pressures in the range of from about 50 to about 2000 PSIG, or above.

THE OXYGEN PROBLEM

Dissolved oxygen is objectionable in boiler waters because of the corrosive effect on metals of construction, such as iron and steel in contact with these waters. Oxygen can be removed from these waters by the addition of various chemical reducing agents, known in the art as oxygen scavengers. Various oxygen scavengers have been used in boiler water systems, which oxygen scavengers include sulphite and bisulfite salts, hydrazine, hydroxylamine, carbohydrazides, hydroquinones, hydroquinones in combination with various amines which do not cause precipitation of the hydroquinone, reduced methylene blue, mixtures of hydroxylamine and neutralizing amines, dihydroxy acetones and combinations thereof with hydroquinone and other catalysts, ascorbic acid, and erythorbic acid, particularly as ammonia or amine neutralized salts, catalyzed hydrazines where the catalysts may include complex cobalt salts, other catalyzed hydroquinone compositions, and various combinations of all the above, including but not limited to hydroquinone in combination with various neutralizing amines and in turn combined with erythorbic or ascorbic acid, carbohydrazide; salicylaldehyde catalyzed hydroquinone, combinations of N,N dialkyl substituted hydroxylamines with or without hydroquinones, dihydroxybenzenes, diaminobenzenes, or aminohydroxybenzene, optionally in the presence of neutralizing amines, and various amine combinations with gallic acid blends.

These oxygen scavengers are taught in the following U.S. patents;
U.S. Pat. No. 4,067,690, Cuisia, et al.
U.S. Pat. No. 4,269,717, Slovinsky
U.S. Pat. No. 4,278,635, Kerst
U.S. Pat. No. 4,279,767, Muccitelli
U.S. Pat. No. 4,282,111, Ciuba
U.S. Pat. No. 4,289,645, Muccitelli
U.S. Pat. No. 4,311,599, Slovinsky
U.S. Pat. No. 4,350,606, Cuisia, et al.
U.S. Pat. No. 4,363,734, Slovinsky
U.S. Pat. No. 4,419,327, Kelly, et al.
U.S. Pat. No. 4,487,708, Muccitelli
U.S. Pat. No. 4,540,494, Fuchs, et al.
U.S. Pat. No. 4,541,932, Muccitelli
U.S. Pat. No. 4,549,968, Muccitelli
U.S. Pat. No. 4,569,783, Muccitelli
U.S. Pat. No. 4,626,411, Nemes, et al
U.S. Pat. No. 4,929,364, Reardon, et al
U.S. Pat. No. 4,968,438, Soderquist, et al.

Each of these patents is incorporated herein by reference.

In addition, the general concepts involved in controlling oxygen corrosion by eliminating oxygen and passivating metal surfaces in contact with boiler waters have been reviewed in the following papers, 1. "The Oxidation and Degradation Products of Volatile Oxygen Scavengers and Their Relevance in Plant Applications" Ellis, et al, Corrosion, 87, (Mar. 9-13, 1987), Paper No. 432.
2. "New Insights into Oxygen Corrosion Control", Reardon, et al, Corrosion, 87, (Mar. 9-13, 1987), Paper No. 438.
3. "Oxygen Scavengers", Nowak, Corrosion, 89, (Apr. 17-21, 1989), Paper No. 436.
4. "Characterization of Iron Oxides Films Generated in a New Boiler Feed Water Simulator", Batton, et al, Corrosion, 90, (Apr. 23-27, 1990), Paper No. 144.
5. "Controlling Oxygen in Steam Generating Systems", Jonas, et al, Power, Page 43-52, (May, 1990).

The above summaries, U.S. patents and literature are believed to give and provide a relatively complete background in regards to the use of oxygen scavengers of various types in boiler waters and the benefits of accomplishing the removal of oxygen from these boiler waters.

In spite of the extensive art regarding oxygen scavenging from boiler waters, there are certain limitations in the technology being practiced which limitations are primarily involved with passivation of the metal surfaces and the formation of oxygen scavenging species which are sufficiently active in boiler waters and yet sufficiently volatile so as to at least proportionately accumulate in sufficient concentration in the condensate systems, thereby not only protecting the boiler metal surfaces but also the condensate system metal surfaces from corrosion caused by the presence of oxygen.

It would therefore be an advance in the art to provide an oxygen scavenger which would passivate metal surfaces in contact with boiler waters which metal surfaces include those metal surfaces involved with heat transfer and formation of steam and also those metal surfaces in contact with steam and condensates derived from generated steams and condensed steams in the condensate system and return condensate water systems of an operating boiler. It would also be of benefit to have an oxygen scavenger that could be an amine or amino compound having sufficient basicity to neutralize any extemporaneous acidity in overhead condensate system. This extemporaneous acidity is often caused by generation of carbon dioxide either as air leakage into the condensate system or possibly even from breakdown of organic materials inadvertently or purposely added to boiler waters.

BRIEF DESCRIPTION OF DRAWINGS

FIG. 4 demonstrates the polarization resistance of ethoxyquin in the presence of morpholine compared to other known oxygen scavengers useful in boiler waters. Morpholine alone is non-passivating carrier, volatile amine. Polarization resistance is a measure of metal passivation and the results of FIG. 4 demonstrates clearly a superior metal passivation capacity for ethoxyquin.

THE INVENTION

Figure 1:
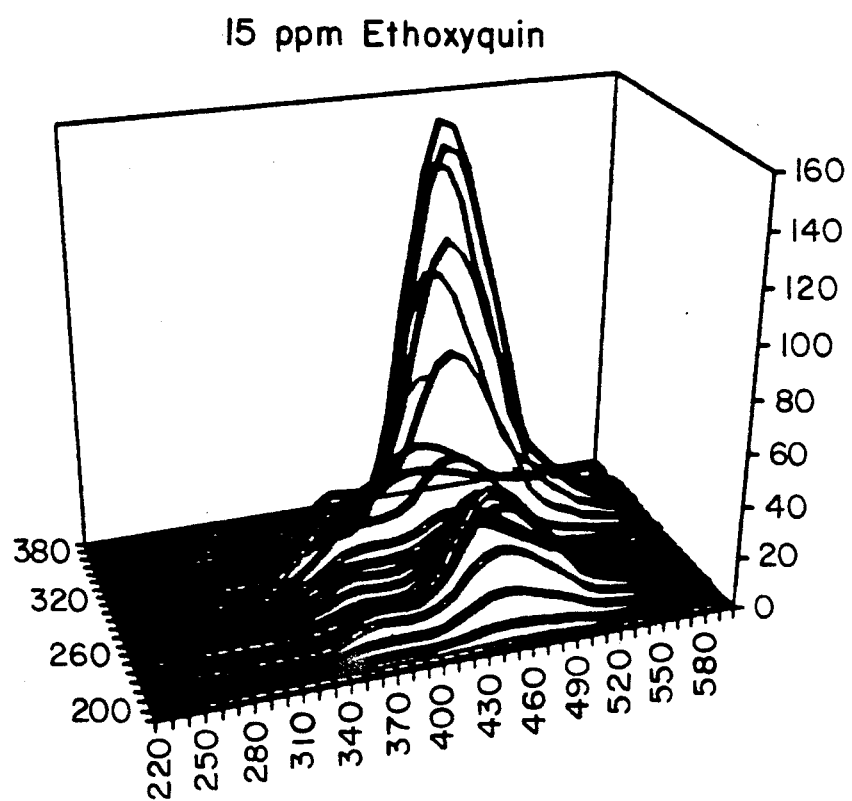
FIG. 1 is a 3-dimensional fluorescent spectra obtained using a 15 part per million solution of ethoxyquin in water containing morpholine.
Figure 2:
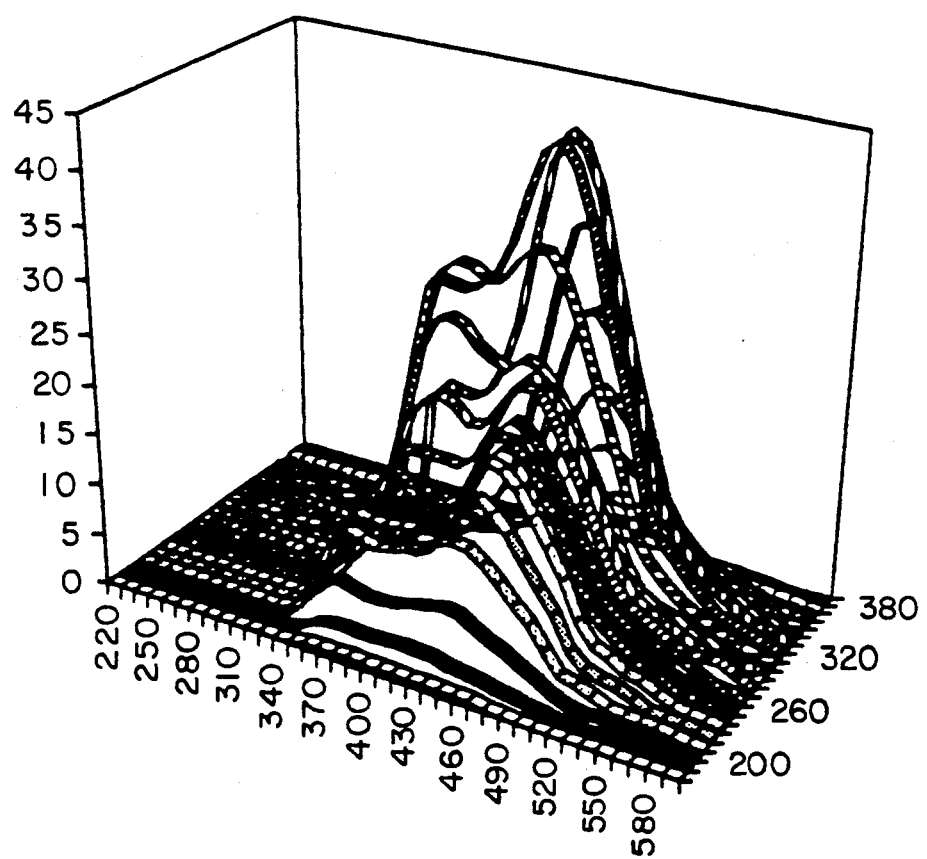
FIG. 2 is the fluorescent 3-dimensional spectrum for ethoxyquin exposed to oxygen demonstrating a shift of the spectra representing the oxidized ethoxyquin species.

We have found a chemical system which has superior oxygen scavenging capabilities, and which enhances passivation of metal surfaces in contact with boiler waters, and has a volatility ratio, in at least one active form of the molecules involved, which can provide both oxygen scavenging capabilities in the condensate system as well as neutralizing and corrosion inhibiting activity in this condensate system. This chemistry is based upon 6-ethoxy-1,2-dihydro-2,2,4-trimethyl quinoline, or simple modifications thereof. Our invention is a method of scavenging oxygen from boiler waters and passivating metal surfaces in contact with said waters comprising adding to the boiler waters an effective oxygen scavenging amount of a compound, or mixtures of compounds having the structure:

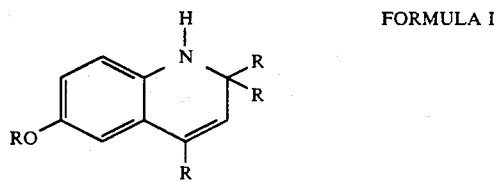

FORMULA I wherein R is independently chosen, at each occurrence, from methyl and ethyl groups.

To better define our chemical structures and the use of these chemical structures for scavenging oxygen from boiler waters, the following preferred formulas are presented:

The preferred active oxygen scavengers have structures set forth in Formula II:

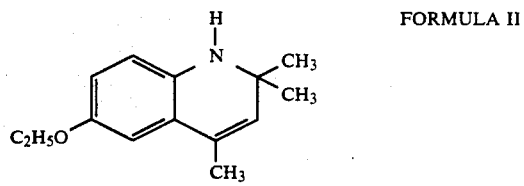

FORMULA II

This specific structure has been called, "Ethoxyquin", and will be referred to as such in this specification. To further exemplify specific and preferred chemical structures, the following chemical formulas are presented. Each formula is within the scope of our invention, and the invention also including any admixture of these chemicals. The following table is not meant to be limiting, but merely is exemplary of formulas, or combinations thereof, which are useful in this invention, including, of course, Formula II above, as well as any admixtures of Formula II with at least one of the formulas below.

Specific examples of the oxygen scavengers of this invention include not only Formula II above, as well as the below formulas, or any admixtures thereof.

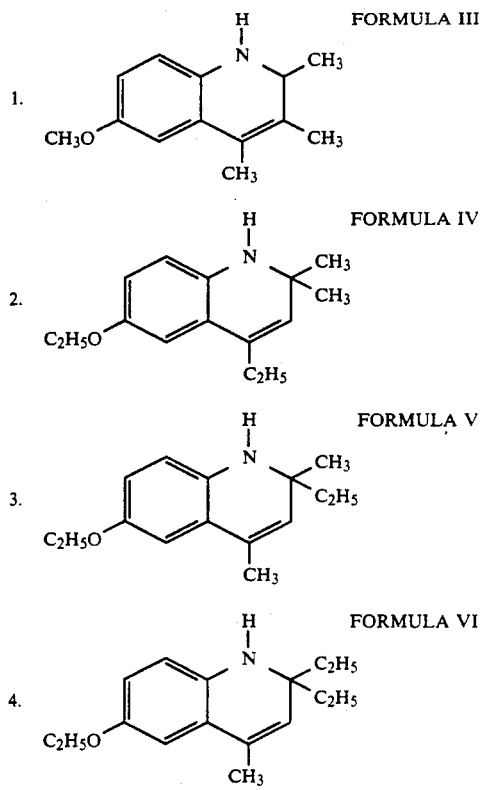

In addition to containing at least one type of the above molecules, our oxygen scavenging formulations may be formulated preferably in a water containing formulation. However, they may be used in pure form, or in admixtures with other active molecules of the same type of substituted quinoline and/or in mixtures with other ingredients normally used in boiler water treatment.

PREFERRED ADMIXTURES

Since the materials involved are such good oxygen scavengers, formulations which contain the materials often have to be protected against degradation in contact with air. To do this, these formulations may typically be made in admixtures with other anti-oxidants. Such anti-oxidants include, but are not necessarily limited to various sulphite or bisulfite salts, ascorbic acid or erythorbic acid or their water soluble salts, diethylhydroxylamine, hydrazine, 1,3-dihydroxyacetone, gallic acids or its salts, hydroquinone, carbohydrazide, 2-ketogluconate, unsubstituted diaminobenzenes, hydroxyaminobenzenes, and the like. Additionally, these known oxygen scavengers could be advantageously admixed with the volatile oxygen scavengers of this invention to obtain advantageous formulations that would be stable for use in boiler water treatment, and provide both improved metal passivation and overhead condensate system corrosion controls.

Other complexing agents may be admixed either to provide stability in a boiler or to provide protection of these formulations against contact with hardness ions and the like. The complexing agents can include, but are not necessarily limited to, ethylenediamine-tetraacetic acid, nitrilotriacetic acid, and such other low molecular weight carboxylate acids, such as citric acid, acetic acid, propionic acid, maleic acid, malic acid, and the like, or their salts.

In addition, these materials may be formed and formulated in the presence of polymers that are water soluble, which polymers would normally be used to treat boiler waters. These polymers normally contain carboxylate containing monomers, and the polymers are water soluble. The polymers include homopolymers and copolymers of acrylic acid, methacrylic acid, maleic acid, maleic anhydride, itaconic acid, and the like. When these polymers are copolymeric in nature, the other monomer units may be chosen from at least one of the group consisting of acrylamide, methylacrylamide, acrylic acid, methacrylic acid, maleic acid, or anhydride, and the like. Polymers and copolymers of acrylic acid and methylacrylic acid and other carboxylated polymers may also contain at least one of the sulfonated monomer species such as, but not limited to, vinyl sulfonate and N-substituted sulfonic acid acrylamides, sulfonated styrenes, and the like.

Finally, these oxygen scavenging formulations may contain inorganic acids, other organic acids and buffering agents, amino acids, orthophosphate ion sources or other precipitating anion sources, organic phosphonate compounds, and the like. Preferably, our formulations contain the so-called volatile amines, such as morpholine, diethyl hydroxyl amine, and the like.

Even though the oxygen scavenging formulation itself may not contain these materials, the boiler waters being treated may still be additionally treated by the addition of at least one or combinations of these other ingredients such that the boiler water itself may contain any one or any combination of any of these materials as outlined above.

BOILER WATER

When we use the term boiler waters, we are primarily describing any water source that is external or internal to an operating industrial steam generating system, particularly boiler systems that are operating at pressures ranging from 50 PSIG up to and including 2,000 PSIG, and above. These boiler waters can include, but again are not necessarily limited to, deaerator drop-leg waters, boiler feed waters, internal boiler waters, boiler condensate waters, any combination thereof and the like. The boiler waters are normally treated by simply adding to the water to be treated a formulation, which formulation contains an effective oxygen scavenging amount of at least one of our compounds, as described above, and which may also contain other anti-oxidants, polymers, acid and/or base neutralizing agents, sequestering and/or chelating agents, also as described above.

ADMIXTURES WITH VOLATILE OR NEUTRALIZING AMINES

In addition to the admixtures mentioned above, the substituted quinoline compounds, generically represented by Formula I above, and, particularly those which contain ethoxylate structures on the aromatic ring, such as Formula II above, may be formulated with various ammonia or amine compounds where the amines may be any organic amines, but particularly are those organic amines chosen from the group consisting of morpholine and hydroxylamines having the structure:

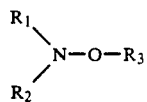

Where R1, R2, and R3 are either the same or different and are selected from the group consisting of hydrogen, lower alkyl, and aryl groups, water soluble salts of these compounds, and the like. Suitable hydroxylamine compounds include hydroxylamine; N,N-diethylhydroxylamine; hydroxylamine hydrochloride; hydroxylammonium acid sulfate, hydroxylamine phosphate, N-ethylhydroxylamine; N,N-dimethylhydroxylamine, O-methylhydroxylamine, N-hexylhydroxylamine; O-hexylhydroxylamine; N-heptylhydroxylamine; N,N-dipropylhydroxylamine and like compounds.

Besides morpholine and the hydroxylamines, other suitable neutralizing amines include cyclohexylamine, diethylaminoethanol, dimethyl(iso)-propanolamine; 2-amino-2-methyl-1-propanol; dimethylpropylamine; benzylamine, 1,2-propanediamine; 1,3-propanediamine; ethylenediamine; 3-methoxy-propylamine; triethylenetetramine; diisopropanolamine; dimethylaminopropylamine; monoethanolamine; secondary butylamine; tert-butylamine; monoisopropanolamine; hexamethylenediamine; triethylenediamine and the like.

Since the active oxygen scavenging compound is also an amine, it is feasible to formulate the substituted quinolines with other oxygen reactive quinoline structures. This combination of the active quinoline formulations with other active forms of our oxygen scavengers may also provide improved water soluble materials for use in our formulations. Although water solubility is not a requirement, it can be beneficial in formulating final products for use in the boiler waters. Such products, however, may also be stabilized by the addition of various cosolvents, solubilizing or dispersing adjuncts, emulsifiers, water soluble or dispersible polymers, inorganic or organic salts, organic amines, such as morpholine, and the like.

APPLICATION AND USE

Use of our substituted quinolines, particularly those of Formulas I and II above, are preferably made by adding the same to boiler feed water, or to the deaerator drop-leg waters so that the oxygen scavenger is useful in removing trace oxygen amounts prior to the water entering the operating boiler. When these formulations are used in the feedwater or the deaerator drop-leg waters, the formulations may contain water, cosolvents, volatile amines, as indicated above, and they may contain specific volatile amines, such as morpholine. The formulation may contain mixtures of volatile amines and fatty amines, such as, but not limited to, oleyl amine. They may also be formed in admixture one with the other, either by themselves or in the presence of other solubilizing or dispersing materials, neutralizing materials, complexing materials, polymeric materials, and the like, or with other anti-oxidants, such as erythorbic acid, hydroquinone, and the like.

The formulations normally contain anywhere from 0.1 up to about 25 weight percent (or above) active oxygen scavenging substituted quinoline component, and these formulations are added in effective oxygen scavenging amounts to the boiler waters, preferably boiler feed water, the deaerator storage or the deaerator drop-leg waters, condensate return waters, internal steam drum boiler waters, condensate waters, steam header waters or the like. Effective concentrations in boiler waters can range from about 10 parts per billion up to and including 50 ppm, or above.

Formulations normally and preferably contain combinations of water, morpholine, and the substituted quinoline compound often referred to as ethoxyquin. When used in these formulations, ethoxyquin scavenges oxygen at at least a 90–95% efficiency ratios when used at a 4:1 mole ratio of ethoxyquin to oxygen. Ethoxyquin performs better at 300° F. than it does at 250° F. It is anticipated to be quite useful in high temperature, high pressure boiler system.

When used with or without volatile amines, such as morpholine, ethoxyquin, also a volatile oxygen scavenger as demonstrated by is V/L volatility ratio, will provide oxygen scavenging not only in boiler waters internal to the boiler but also in condensate waters. The vapor liquid ratio has been determined for ethoxyquin to be on the order of from 3.0 to about 5.0. A specific vapor liquid (V/L) ratio of ethoxyquin (6-dithoxy-1,2-dihydro-2,2,4-dihydroquinoline) at 1,000 pounds per square inch was determined to be 3.6.

By formulating ethoxyquin with organic solvents and/or volatile amines, such as morpholine, an aqueous formulation can be achieved which when added to boiler waters can achieve the oxygen scavenging taught above and also lead to metals passivation, oxygen scavenging and amine neutralization not only in the boiler water but also in the condensate water system of an operating boiler.

A preferred formulation for testing contains 70% morpholine, 5% ethoxyquin, and 25% deionized water. For some tests, a formula consisting of 60% morpholine, 25% EQ, and 15% water was used.

Another formulation successfully made contained from 2,800–3,000 parts per million ethoxyquin in 50% morpholine and 50% water. This later formulation was successfully used at a 4:1 mole ratio based on 100 part per billion oxygen at 300° F. in boiler waters containing an initial pH of 9.5 to successfully scavenge 60% of the oxygen present. (The huge amounts of morpholine used in this experiment was found to reduce $O_2$).

The primary formulation containing 5% ethoxyquin and 70% morpholine, along with 25% deionized water was successfully injected into a test scale boiler to determine the vapor liquid ratio. Again, the vapor liquid ratio at 1,000 psi was determined to be 3.6.

Figure 3:
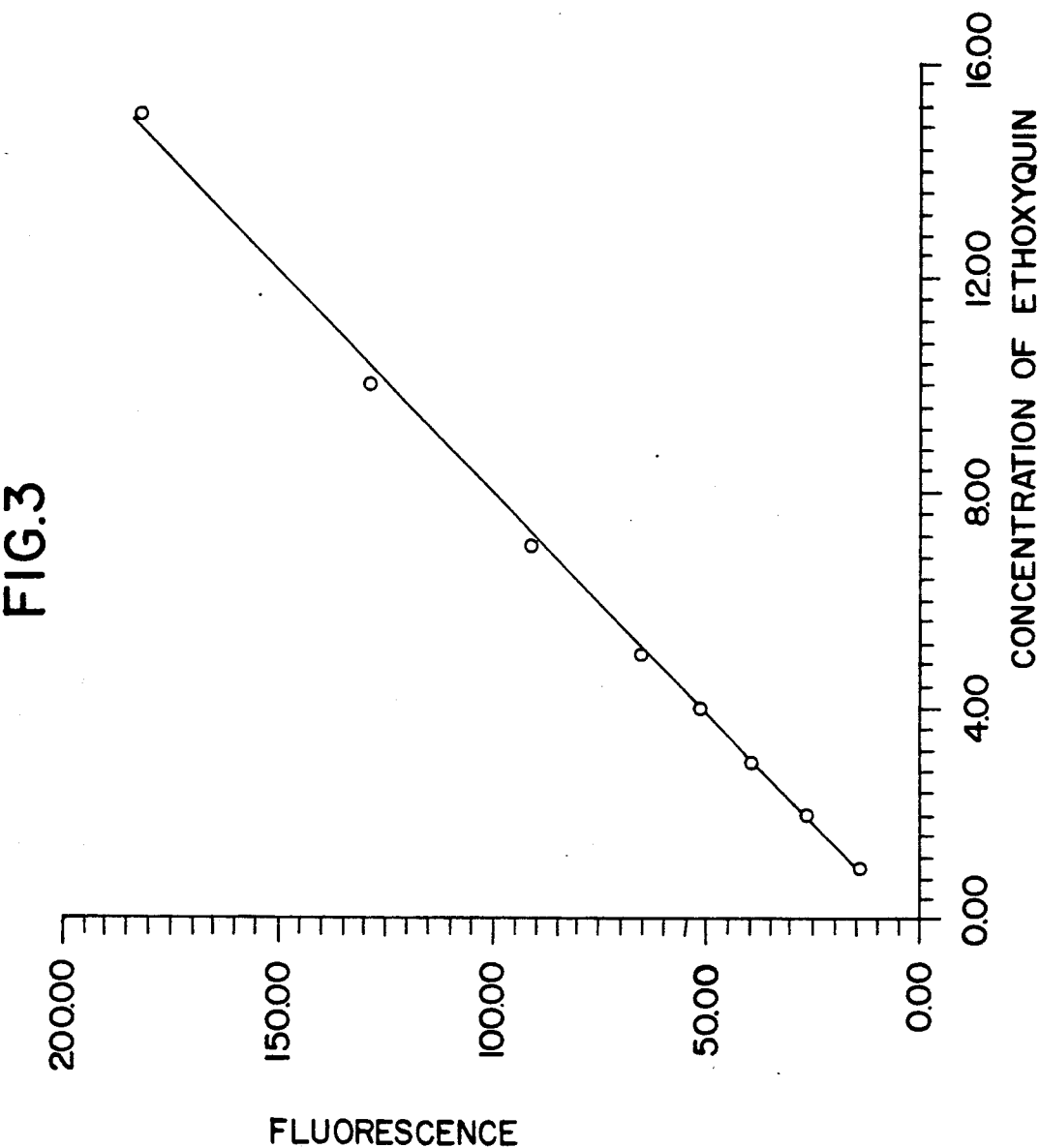
FIG. 3 is the demonstration of the fluorescents intensities at 450 nanometer emission and 340 excitation wavelength demonstrating fluorescent intensity concentration linearity for ethoxyquin.

Easy measurement was made of the presence of ethoxyquin because of its natural fluorescence. Ethoxyquin has no prevalent UV-visible spectra providing features needed to determine concentration, therefore, a three dimensional fluorescence spectra was taken. The formulation containing 5% ethoxyquin was injected into water and the fluorescence spectra taken. The spectra is presented in FIG. 1 and is taken from a concentration in water of 15 parts per million ethoxyquin. The intense fluorescent band at excitation wavelength of 340 nanometers and an emission wavelength of 450 nanometers easily provide sensitivity for analytical measurement. After autooxidation, this intense band having excitation wavelength at 340 nanometers and an emission wavelength at 450 nanometers diminishes, and a new fluorescence band having an excitation wavelength of 330 nanometers and an emission wavelength at 350 nanometers increases. The structure of the compound having these later characteristics is unknown. The important observation is that the linearity at the 450 nanometers emission wavelength verses concentration is achieved. The linearity of the concentration of ethoxyquin was examined at the excitation wavelength of 340–345 nanometers and measured at an emission wavelength of 450 nanometers. This linearity of the relative fluorescent intensity verses concentration is demonstrated in FIG. 3.

Therefore, our invention includes the fluorescence measurement of a concentration of the ethoxyquin in boiler waters during its use as a oxygen scavenger in these same waters by measuring the concentration at a fluorescent excitation wavelength ranging from about 340 to about 345 nanometers and measuring the emission wavelength at about 445–455 nanometers, preferably at 450 nanometers.

These excitation and emission wavelengths are quite characteristics of our ethoxyquin oxygen scavengers. Other fluorescent molecules, which may be used as boiler tracer compounds can be formulated at considerably different excitation and emission wavelengths. For example, a common reference standard fluorescence tracing can easily be measured at 290 nanometers excitation wavelength and 330 nanometer emission wavelength, considerably different from the ethoxyquin oxygen scavenger of this invention.

The vapor liquid ratio determination was done by measuring ethoxyquin concentration at an excitation wavelength of 340 nanometers and the emission wavelength of 450 nanometers. The V/L ratio of ethoxyquin at 1,000 psi was determined to be 3.6.

To better describe our invention, the following examples are provided:

EXAMPLES

In providing these examples, we identify a chemical compound or family of chemical compounds which are highly reactive with oxygen, and which are volatile, such that a high vapor/liquid, or V/L, ratio is obtained when these formulations are fed to an operating boiler. These compounds provide essentially no contribution to dissolved solids in high pressure boiler systems operating at temperatures ranging from 250° F. to about 900° F. or above. The formulations containing these substituted quinoline or ethoxyquin materials may be used with current internal boiler water treatment programs such as those programs including polymers, both the so-called all polymer treatments as well as dispersant polymers in combination with precipitating agents like phosphate or carbonate anions, other oxygen scavengers such as hydroquinone, erythorbic acid, carbohydrazide and the like, and other known and similar treatment agents for boiler waters, such as the neutralizing amines, the fatty amines, and the like.

In addition, these substituted quinoline compounds have low toxicity, can be easily formulated in aqueous or organic based solutions, either soluble or dispersed as need be, and are cost effective. Finally, these materials are easily monitored because of the unique fluorescence characteristics of these ethoxyquin compounds.

Our substituted quinoline compounds, especially ethoxyquin, essentially have been demonstrated to scavenge oxygen stoichiometrically at approximate mole ratios of 4:1 or above, at temperatures of about 250° F. and has better oxygen scavenging efficiency at temperatures of 300° F. and above.

This ethoxyquin compound is highly volatile and is demonstrated to have a vapor/liquid distribution ratio similar to diethylhydroxylamine. This V/L ratio is demonstrated to be in the 3-8 V/L ratio range, and the V/L ratio is, at 1,000 psi, 3.6, providing for oxygen scavenging both in internal boiler waters at high temperatures and in condensate waters at lower temperatures.

These materials, or their mixtures can be easily fed to boiler waters, provide oxygen scavenging capability, not only in the boiler feed water, but also in the operating boiler waters, and because of its volatility in the boiler, in the condensate water systems as well.

In addition, the experiments presented demonstrate, via electro chemical information, that these compounds also provide for improved metal passivation of boiler surfaces in contact with boiler waters containing these ethoxyquin materials.

A most preferred material, ethoxyquin, has toxicity that is less than hydroquinone, considerably less than unsubstituted phenylene diamines and would be anticipated to be safer in use than formulations containing either of the above. These ethoxyquin materials have, in fact, been used as sterilants for feed grains, a use requiring essentially non-toxic characteristics.

Analytical procedures may be utilized to measure chemical oxidation of our compounds and are simply followed by the measurement, via fluorescence spectroscopy, at emission and excitation wavelengths unique to these compounds, particularly ethoxyquin itself which has an excitation wavelength at 340 nanometers and an emission wavelength of 450 nanometers.

Experiments demonstrating electrochemical passivation are employed as follows:

HIGH TEMPERATURE PASSIVATION CHARACTERISTICS

1. Using techniques described in a Nalco Chemical Company reprint 522, tubular mild steel samples, prepared in the usual manner, were conditioned for a period of three days under blank conditions, then three days treatment using our substituted phenylenediamines at concentrations equivalent to 100 parts per billion, calculated as hydrazine. At the end of the three day treatment test, these mild steel tubes were removed and subjected to linear polarization tests.

2. The results of these tests are set forth in FIG. 4, entitled "Polarization Resistance Comparison of Oxygen Scavengers". In this FIG. 4, polarization resistance (or Ep) of ethoxyquin (EQ) are compared to $R_P$ of hydrazine and carbohydrazide; N, N, N', N', tetramethyl phenylene diamine, diethylhydroxylamine, and also to no treatment (blank). The results indicated that our new ethoxyquin oxygen scavengers are metal passivators, particularly as temperature increases, and that they passivate at least as well as known passivators such as carbohydrazide. Similar tests with diethylhydroxylamine and hydroquinone demonstrate that these oxygen scavengers provide no passivation beyond that observed under blank conditions.

3. The technique in the above referenced Nalco reprint 522, prepares a tubular mild steel sample by conditioning it for 3 days in an aqueous caustic solution at pH=9.0. This aqueous medium is initially anaerobic (i.e. less than 2 ppb oxygen) and is maintained at less than 5 ppb oxygen during the conditioning period. After conditioning, this tubular sample is exposed an additional 3 days to the same pH 9 caustic solution, now containing the oxygen scavenger/passivative treatment agent.

4. After this second three day period, linear polarization measurements are performed and analyzed to produce the results described above. In the tests for ethoxyquin, tubes without heat flux show a lower polarization resistance than the tubes with heat flux. Visually, however, both tubes, treated with the different form of oxygen scavenger, had an adherent dark brown to blue surface with no evidence of pitting.

Linear polarization is an electrochemical technique providing for the imposition of known potentials, which potentials are ±10 millivolts on either side of the $E_{corr}$ (the open circuit potential of the test electrode material, that is the corrosion potential). $E_{corr}$ is defined as the potential at which the rate of reduction is equal to the rate of oxidation. The measurement of generated currents and the determination of the polarization resistance, $R_p$, which determination is based upon the slope measurements of the current versus potential scans available under the test conditions, are used to analyze the effect and the presence of passive layers formed during the conditioning tests outlined above.

These results are then interpreted to measure the ability of our oxygen scavengers, as well as other oxygen scavengers to passivate the metal surfaces. These electrochemical procedures provide the results discussed above and presented in FIG. 4. The results of this test sequence indicates that ethoxyquin is a better passivator than is carbohydrazide, hydrazine, or DEHA.

VAPOR/LIQUID VOLATILITY RATIO

Volatility of the chemical, ethoxyquin, was found to be high, in the range of 3-8 V/L ratio. This volatility is comparable to the volatility observed for diethylhydroxyalamine, a known volatile compound used as an oxygen scavengers in boiler systems. Volatility was determined by scale boiler tests. Boiler feed water, i.e. FW, was made up with caustic (NaOH) to a pH of 10, and NaCl at 20 ppm. The pH of the blowdown waters, i.e. B.D., would then be about 11, with 200-400 ppm Na. Ethoxyquin concentration was determined by the fluorescence analytical method described above for the BD, FW, and condensate waters. Volatility ratios are determined from these measurements.

SCALE BOILER TESTS

Conditions for oxygen scavenger scale boiler tests were similar to those used for the determination of V/L ratios elsewhere. In the first series of tests, ethoxyquin was fed into the test boiler system at approximately 5 parts per million, based on total water feed. Scale boiler tests were used to test the volatility of ethoxyquin in an operating boiler environment. In at least one test, the scale boiler was operated in the presence of hardness.

In all of these tests, the vapor/liquid ratio range from 3 to 5.

Ethoxyquin was tested in the presence of water and morpholine. Also, ethoxyquin was tested separately and with polymers containing acrylic acid and acrylamide. These tests were done in the presence, in the feedwater, of about 1.5 parts per million total hardness, as calcium carbonate and when polymer was present, a polymer to hardness ratio ranging from about 4.4:1 to about 14:1. The boiler operating pressures ranged from 600 to about 1500 PSIG. The presence of these oxygen scavengers did not, within experimental error, affect the polymer's abilities to sequester and transport calcium, magnesium, $SiO_2$, and the like across the boiler. Therefore, it is anticipated that these oxygen scavengers are useful in combinations with these polymer based boiler water treatments. Ethoxyquin was also tested with boiler water treatments including the so called co-ordinated phosphate and residual phosphate programs with no detrimental effects being noted.

Oxygen scavenging tests were completed using a field temperature simulator, or FTS unit. This device mixes the $O_2$ scavenger into a flow through water sample controlled at pH 8.5–9.5, the sample also containing dissolved oxygen at about 100 ppb (parts per billion).

The temperature is increased to about 250° F. to about 300° F. for about 10–12 minutes. The oxygen content is measured both before and after dosages of oxygen scavenger are added. Results are reported in terms of oxygen scavenged by the oxygen scavenging compound.

Results are presented in Table I:

TABLE 1

ETHOXYQUIN FTS DATA

| pH | TEMP F | OX IN PPB | OX OUT PPB | % SCAV | DOSE PPM | RATIO mole/mole |
|---|---|---|---|---|---|---|
| 9.5 | 250 | 124 | 80 | 35 | 2.03 | 2.4 |
| 9.5 | 250 | 124 | 18 | 85 | 7.8 | 9.1 |
| 9.5 | 300 | 124 | 6.6 | 95 | 3.72 | 4.4 |
| 9.5 | 300 | 124 |  | 68 | 2.30 | 2.4 |
| 9.5 | 300 | 104 | 74 | 29 | 1.74 | 2.5 |
| 9.5 | 300 | 104 | 18 | 83 | 3.41 | 4.8 |
| 9.5 | 300 | 104 | 52 | 50 | 1.74 | 2.5 |

The results of all other tests above are presented in Tables II and III below:

TABLE II

TEST #16682

| PURPOSE (V/L) | SAMPLE | DADL | COND | BD | V/L |
|---|---|---|---|---|---|
|  |  | ETHOXYQUIN FLUORESCENCE (REL) | | | |
| 1000 PSI | 1 | 52.7 | 71.7 | 16.7 | 4.27 |
|  | 2 | 22.6 | 39.8 | 11.5 | 3.46 |
|  | 3 | 23.7 | 47.2 | 14.8 | 3.19 |

TEST #16684

ETHOXYQUIN FLUORESCENCE (REL)

| V/L | | | | | |
|---|---|---|---|---|---|
| 1000 PSI | 3 | 3.6 | 9.9 | 2.7 | 3.67 |
| | 4 | 8.4 | 15.3 | 2.5 | 6.12 |
| | 5 | 8.9 | 14.1 | 3.6 | 3.91 |

TEST #16691

| Sample 16691 | Ca ppm | Mg ppm | SiO2 ppm | Ethoxyquin Fluor. rel | V/L |
|---|---|---|---|---|---|
| FW | 1.1 | 0.47 | 0.52 | | |
| DADL1 | 1.3 | 0.48 | 0.55 | | |
| DADL2 | 1.2 | 0.47 | 0.55 | | |
| DADL3 | 1.3 | 0.48 | 0.56 | 71 | |
| DADL4 | 1.2 | 0.47 | 0.54 | 39.1 | |
| DADL5 | | | 0.54 | 65.8 | |
| DADL6 | | | 0.54 | 40.3 | |
| BD1 | 10.2 | 4.82 | 5.2 | | |
| BD2 | 10.4 | 4.85 | 5.2 | | |
| BD3 | 9.5 | 4.52 | 5.64 | 42 | |

TABLE II-continued

| BD4 | 9.3 | 4.35 | 5.28 | 29.4 | |
| BD5 | | | 5.31 | 39.6 | |
| BD6 | | | 5.37 | 24.7 | |
| COND1 | | | | | |
| COND2 | | | | | |
| COND3 | | | | 145 | 3.452381 |
| COND4 | | | | 93.4 | 3.176871 |
| COND5 | | | | 121.2 | 3.060606 |
| COND6 | | | | 84.9 | 3.437247 |

DADL - Deaerator Dropleg
COND - Condensate
BD - Blowdown
V/L - Vapor/Liquid Ratio
FW - Feed Water

TABLE III

Scale Boiler Testing of Ethoxyquin Effect on Internal Treatment Programs

| Test No. | Reductant ppm | Internal Treatment | Psig | Dosage ppm Treat/"H" | ppm "H" | % Ca | % Mg | % SiO2 | % Polymer |
|---|---|---|---|---|---|---|---|---|---|
| 3 | None | Polymer 1 | 1000 | 7 | 1.5 | 100(2) | 98(.6) | 109 | 95 |
| 4 | 2.2 EQ | Polymer 1 | 1000 | 7 | 1.5 | 95(3.2) | 105(2) | 137 | 90.8 |
| 5 | 2.2 EQ | Polymer 1 | 1000 | 7 | 1.5 | 93(2.5) | 99(5) | 117 | 94 |
| 6 | 2.2 EQ | Polymer 1 | 1000 | 7 | 1.5 | 97(2) | 109(4.4) | 100 | 87 |

Polymer 1 is a 70/30 acrylic acid/acrylamide copolymer having a molecular weight in the range of 5000–25000.

OXYGEN SCAVENGING CAPACITY

Ethoxyquin was tested in the Field Temperature Simulator, or the "FTS" unit for oxygen scavenging ability. At 250°–300° F. and an EQ feed at about 2.3:1 to 4:1 to 9:1 molar ratio to oxygen, the oxygen level in test waters was scavenged from concentrations of about 124 parts per billion to about 6–80 parts per billion. Most efficient scavenging was observed at from about a 2.5:1 to about 4.8:1 molar ratio, relative to oxygen present.

FTS TESTING

Testing in the FTS unit, which is presented in Table I, determined that ethoxyquin can react with oxygen, preferably at an approximate molar ratio of about 4:1.

Having described our invention, we claim:

1. A method of scavenging oxygen from boiler waters comprising adding to said boiler waters an effective amount of an oxygen scavenging quinoline compound, or mixtures of compounds, having the structure:

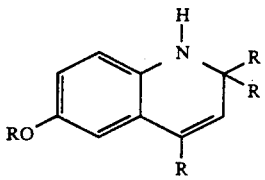

wherein R, at each occurrence, is independently chosen from the group consisting of methyl and ethyl groups, or mixtures thereof.

2. The method of claim 1 wherein the quinoline is formulated in a water solution containing a volatile amine.

3. The method of claim 2 wherein the volatile amine is morpholine.

4. The method of claims 1, 2, or 3 wherein the boiler waters are selected from at least one of the group consisting of boiler feed waters, boiler condensate waters, boiler blowdown waters, and internal boiler waters.

5. The method of claims 1, 2, or 3 wherein the effective oxygen scavenging amount of the quinoline compound ranges from about 10 parts per billion to about 50 parts per million, based on the boiler waters to which the quinoline is added.

6. The method of claim 4 wherein the effective oxygen scavenging amount of quinoline ranges from 50 ppb to 50 ppm, based on the boiler waters to which the quinoline is added.

7. A method of scavenging oxygen from boiler waters comprising treating said waters with an oxygen scavenging compound having the structure:

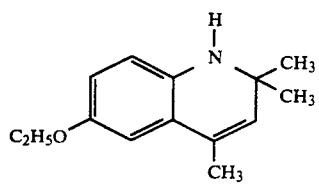

in combination with other boiler water treating agents, chosen from the group consisting of:
(a) volatile amines,
(b) filming amines,
(c) inorganic acids chosen from the group consisting of hydroxamic acids, $H_3PO_4$, $H_2SO_4$, and mixtures thereof;
(d) organic acids from the group consisting of formic acid, acetic acid, propionic acid, malic acid, maleic acid, citric acid, ethylene diamine tetraacetic acid, nitrilotriacetic acid, hydroxyethylene diamine tetraacetic acid, and mixtures thereof;
(e) amino acids, and
(f) mixtures thereof 8. The method of claims 1, 2, 3, or 7 wherein the boiler waters also contain at least one of the compounds chosen from the group consisting of:
(1) water soluble carboxylate containing polymers having a molecular weight ranging from about 500 to about 50,000,
(2) a source of orthophosphate anion,
(3) an organic phosphonate compound,
(4) complexing agents chosen from the group consisting of EDTA and NTA,
(5) oxygen scavenging compounds chosen from the group consisting of bisulfite salts, erythorbic acid and its salts, ascorbic acid and its salts, DEHA, hydrazine, methyl ethyl ketoxime, 1,3 dihydroxy acetone, gallic acid, hydroquinone, an unsubstituted diaminobenzene, an hydroxy diaminobenzene, carbohydrazide, or mixtures thereof, and
(6) mixtures thereof;

9. The method of claims 1, 2, 3, or 7 wherein the quinoline compound is ethoxyquin and its concentration in boiler waters is measured by fluorescence spectroscopy at an excitation wavelength ranging from 335–345 nanometers and an emission wavelength of 445–455 nanometers, the results compared to known standards to determine said concentration by linear relationship.

10. The method of claim 9 wherein the excitation wavelength is 340 nanometers, and the emission wavelength is 450 nanometers.

* * * * *

UNITED STATES PATENT AND TRADEMARK OFFICE
CERTIFICATE OF CORRECTION

PATENT NO. : 5,167,835

DATED : DECEMBER 1, 1992

INVENTOR(S) : SCOTT R. HARDER

It is certified that error appears in the above-identified patent and that said Letters Patent is hereby corrected as shown below:

FIG.4, Symbols inside the graph:

- □ BLANK
- ■ CHZ
- ▲ HZ
- ● TMPD
- △ DEHA
- ▭ EQ

UNITED STATES PATENT AND TRADEMARK OFFICE
CERTIFICATE OF CORRECTION

PATENT NO. : 5,167,835
DATED : December 1, 1992
INVENTOR(S) : Scott R. Harder

It is certified that error appears in the above-indentified patent and that said Letters Patent is hereby corrected as shown below:

LETTERS PATENT SHOULD READ AS:

— ☐ — EQ

— ■ — CHZ

— ▲ — HZ

— ● — TMPD

— △ — DEHA

— ▭ — BLANK

Signed and Sealed this

Twenty-eighth Day of December, 1993

Attest:

BRUCE LEHMAN

Attesting Officer     Commissioner of Patents and Trademarks